US008123407B2

(12) United States Patent
Shirai

(10) Patent No.: US 8,123,407 B2
(45) Date of Patent: Feb. 28, 2012

(54) BALL SPLINE DEVICE

(75) Inventor: Takeki Shirai, Tokyo (JP)

(73) Assignee: THK Co., Ltd., Tokyo (JP)

( * ) Notice: Subject to any disclaimer, the term of this patent is extended or adjusted under 35 U.S.C. 154(b) by 366 days.

(21) Appl. No.: 12/513,596

(22) PCT Filed: Nov. 13, 2007

(86) PCT No.: PCT/JP2007/071981
§ 371 (c)(1),
(2), (4) Date: May 5, 2009

(87) PCT Pub. No.: WO2008/065878
PCT Pub. Date: Jun. 5, 2008

(65) Prior Publication Data
US 2010/0098358 A1      Apr. 22, 2010

(30) Foreign Application Priority Data

Nov. 30, 2006   (JP) ................................. 2006-323697

(51) Int. Cl.
*F16C 29/06*   (2006.01)
(52) U.S. Cl. .......................................... 384/43; 384/45
(58) Field of Classification Search ............ 384/43–45; 464/168
See application file for complete search history.

(56) References Cited

U.S. PATENT DOCUMENTS

| | | | | |
|---|---|---|---|---|
| 1,918,108 A | * | 7/1933 | Jonkhoff | 384/43 |
| 2,559,292 A | * | 7/1951 | Ferger | 384/43 |
| 3,143,867 A | * | 8/1964 | Anderson | 464/168 |
| 3,610,709 A | | 10/1971 | Allen | |
| 3,659,435 A | * | 5/1972 | Nilsson | 464/168 |
| 3,673,817 A | * | 7/1972 | Doran et al. | 464/168 |
| 3,689,124 A | | 9/1972 | Irwin | |
| 4,054,333 A | | 10/1977 | Esmond et al. | |
| 4,375,305 A | | 3/1983 | Teramachi et al. | |

(Continued)

FOREIGN PATENT DOCUMENTS

DE           1450060 A1        7/1969

(Continued)

OTHER PUBLICATIONS

International Search Report of PCT/JP2007/071981, date of mailing Dec. 18, 2007.

*Primary Examiner* — Thomas R Hannon
(74) *Attorney, Agent, or Firm* — Westerman, Hattori, Daniels & Adrian, LLP

(57) ABSTRACT

Provided is a ball spline device, in which an outer diameter of a nut member can be downsized to the maximum while sufficiently performing an original function, and which can keep reliability while being capable of being simply manufactured at lower cost without involving time and effort in assembly, in which a nut member has a track groove which is formed on an inner peripheral surface facing a spline shaft, the balls circulating in the track groove, the track groove comprises: a linear load groove formed so as to face the ball rolling groove of the spline shaft; a linear non-load groove provided parallel to the linear load groove; and a pair of ball deflection grooves for communicably coupling the linear load groove and the linear non-load groove with each other so as to allow the balls to intercommunicate therebetween, and the ball deflection grooves forcibly change an advancing direction of the balls rolling in the ball rolling groove and cause the balls to depart from the ball rolling groove with use of a profile of the spline shaft.

4 Claims, 5 Drawing Sheets

U.S. PATENT DOCUMENTS

| | | |
|---|---|---|
| 4,397,802 A | 8/1983 | Ernst et al. |
| 4,444,443 A | 4/1984 | Teramachi |
| 4,634,296 A | 1/1987 | Watanabe |
| 4,659,239 A | 4/1987 | Teramachi |

FOREIGN PATENT DOCUMENTS

| | | | |
|---|---|---|---|
| JP | 47-21001 | B1 | 6/1972 |
| JP | 47-51491 | B1 | 12/1972 |
| JP | 50-6611 | B1 | 3/1975 |
| JP | 53-117152 | A | 10/1978 |
| JP | 56-120817 | A | 9/1981 |
| JP | 58-137616 | A | 8/1983 |
| JP | 61-179414 | U | 11/1986 |
| JP | 61-266822 | A | 11/1986 |
| JP | 9-112553 | A | 5/1997 |

* cited by examiner

BALL SPLINE DEVICE

TECHNICAL FIELD

The present invention relates to a ball spline device, in which a spline shaft and a nut member are combined through an intermediation of a large number of balls so as to be capable of making relatively linear movement, and which is used for linear guide portions of working machines and various industrial machines, and as torque transmission portions of industrial robots.

BACKGROUND ART

Conventionally, examples of the ball spline devices of those types include one disclosed in JP 61-179414 U, one disclosed in JP 58-137616 A, and the like. Each of those ball spline devices includes a spline shaft provided with multiple ball rolling grooves extending in the axial direction thereof, and a nut member assembled to the spline shaft through an intermediation of a large number of balls and provided with endless circulation paths of the balls. In accordance with endless circulation of the balls, the nut member can freely move about the spline shaft along the longitudinal direction thereof.

Further, each of the endless circulation paths for the balls, which is provided to the nut member includes a load path in which the balls roll while bearing load acting between the nut member and the spline shaft, a ball returning path formed parallel to the loading path, and U-shaped direction converting paths for coupling the load path and the ball returning path with each other. Further, the direction converting paths are arranged at both ends of the load path and the ball returning path, whereby the endless circulation paths for the balls are formed.

When the ball returning path is formed by passing through the nut member itself, there is a tendency that the nut member is increased in thickness so as to be larger in diameter. In addition, when the diameter of the ball is small, the diameter of ball returning holes is also small, and hence it is difficult to form the ball returning holes directly to the nut member. Thus, in the ball spline devices disclosed in the above-mentioned documents, a retainer made of a synthetic resin is interposed in a gap between the inner peripheral surface of the nut member formed into a cylindrical shape and the spline shaft passing therethrough, and the ball returning paths and the direction converting paths are formed by cooperation of the retainer and the nut member.

Further, in order to move the balls rolling in the load paths to the ball returning paths through direction conversion, it is necessary to cause the balls to depart from the ball rolling grooves of the spline shaft. Therefore, in the conventional ball spline devices, ball scooping portions continuous with the direction converting paths are provided to the retainer. The balls having rolled in the ball rolling grooves climb up the ball scooping portions so as to be departed from the ball rolling grooves, and then accommodated in the direction converting paths formed by cooperation of the retainer and the nut member.

Patent Document 1: JP 61-179414 U
Patent Document 1: JP 58-137616 A

DISCLOSURE OF THE INVENTION

Problem to be Solved by the Invention

However, in each of the conventional ball spline devices described above, the ball returning paths are formed by cooperation of the retainer and the nut member. Thus, the ball returning paths are inevitably departed from the spline shaft to the radial direction thereof at least by thickness of the retainer. Further, the direction converting paths and the ball returning paths are formed in the retainer, and hence the retainer is formed by injection molding of a synthetic resin for the purpose of realizing the complicated shapes thereof. In this context, when the retainer attached to the inner peripheral surface of the nut member is deformed, the retainer is brought into contact with the spline shaft, and hence the movement of the but nut member is obstructed. Therefore, it is difficult to form the retainer to be extremely thin. As a result, in each of the conventional ball spline devices in which the retainer is accommodated between the spline shaft and the nut member, the outer diameter of the nut member is influenced by the thickness of the retainer, which leads to limitation on reduction of the diameter of the nut member.

Further, in each of the conventional ball spline devices, the balls are departed from the ball rolling grooves of the spline shaft by the ball scooping portions provided to the retainer. In this case, the balls climb up the scooping portions so as to be lifted directly above the ball rolling grooves, and then enter the direction converting paths. Thus, it is necessary to provide spaces between the nut member and the spline shaft by that much, which also leads to prevention of downsizing of the nut member.

In addition, it is necessary to provide the retainer in each of the conventional ball spline devices, and necessary to accurately position the ball scooping portions provided to the retainer with respect to the ball rolling grooves. Therefore, there are problems in that manufacture and assembly thereof involve time and effort and reliability of assembly accuracy is liable to be impaired.

Means for Solving the Problem

The present invention has been made in view of the problems described above, and an object thereof is to provide a ball spline device in which the outer diameter of the nut member can be downsized to the maximum while sufficiently performing the original function, and which can keep reliability while being capable of being simply manufactured at lower cost without involving time and effort in assembly.

In order to achieve the above-mentioned object, the present invention provides a ball spline device including: a spline shaft in which a ball rolling groove is formed on an outer peripheral surface thereof along an axial direction; and a nut member formed into a substantially cylindrical shape so that the spline shaft passes therethrough, assembled to the spline shaft through an intermediation of a large number of balls, and having a track groove which is formed on an inner peripheral surface facing the spline shaft, the balls circulating in the track groove.

The track groove includes: a linear load groove formed so as to face the ball rolling groove of the spline shaft and to form a load path of the balls; a linear non-load groove provided parallel to the linear load groove and opened to the outer peripheral surface of the spline shaft; and a pair of ball deflection grooves for communicably coupling the linear load groove and the linear non-load groove with each other so as to allow the balls to intercommunicate therebetween while being opened to the outer peripheral surface of the spline shaft.

That is, the ball spline device of the present invention is not provided with a retainer between the spline shaft and the nut member, and the balls bear load between the spline shaft and the nut member while circulating in the track groove formed in the inner peripheral surface of the nut member. Of the linear load groove, the linear non-load groove, and the ball deflection grooves, which constitute the track groove, the linear load groove constitutes a load path of the balls while facing the ball rolling groove of the spline shaft, and hence the linear load groove is naturally opened to the spline shaft. In addition, the linear non-load groove and the ball deflection grooves are also opened to the outer peripheral surface of the spline shaft, whereby the balls roll in the linear non-load groove and the ball deflection grooves in a state of facing the spline shaft.

Accordingly, an endless circulation path of the ball is formed in a state of being held in contact with the outer peripheral surface of the spline shaft. When the diameter of the spline shaft is the same as those of the conventional ball spline devices each provided with the retainer, it is possible to reduce the outer diameter of the nut member. This enables downsizing of various industrial machines in which ball spline devices are used. From another viewpoint, when the outer diameter of the nut member to be used in the various industrial machines is predetermined, a spline shaft having a larger diameter in comparison with those of the conventional products can be used in the ball spline device of the present invention. As a result, it is possible, in accordance with enhancement in rigidity of the spline shaft, to enhance accuracy in movement of the nut member and to increase torque transmitted, whereby performance of the industrial machines in which the ball spline device is adopted is enhanced.

Meanwhile, in the ball spline device of the present invention, the ball deflection grooves are structured so as to guide, while forcibly changing an advancing direction of the balls rolling in the ball rolling groove of the spline shaft and causing the balls to depart from the ball rolling groove with use of a profile of the spline shaft, the balls departed therefrom into the linear non-load groove in cooperation with the outer peripheral surface of the spline shaft.

That is, in the present invention, when the balls are departed from the ball rolling groove of the spline shaft, a structure in which the balls are lifted directly above the ball rolling groove with use of the scooping portion is not adopted unlike the conventional case, and the profile of the spline shaft is used instead thereof. The ball deflection grooves opened to the spline shaft forcibly change the advancing direction of the balls rolling in the ball rolling groove, whereby the balls are departed from the ball rolling groove along the profile of the spline shaft, and guided into the linear non-load groove while the rolling direction thereof is regulated by the outer peripheral surface of the spline shaft and the ball deflection grooves.

In the ball spline device of the present invention, in which the balls are departed from the ball rolling grooves, it is unnecessary to provide the scooping portion for lifting up the balls from the ball rolling groove, and time and effort for positioning the scooping portion with respect to the ball rolling groove are eliminated. Accordingly, the ball spline device of the present invention can be simply manufactured at lower cost. Further, the balls successively climb up the conventional scooping portion, and hence there is a risk of generating deformation and breakage when the balls circulate therein at high speed. However, in the ball spline device of the present invention in which the scooping portion is not provided, there is no risk as described above, and hence it is possible to enhance reliability in moving the nut member with respect to the spline shaft at high speed.

BEST MODE FOR CARRYING OUT THE INVENTION

In the following, a ball spline device of the present invention is described in detail with reference to the accompanying drawings.

Figure 1:
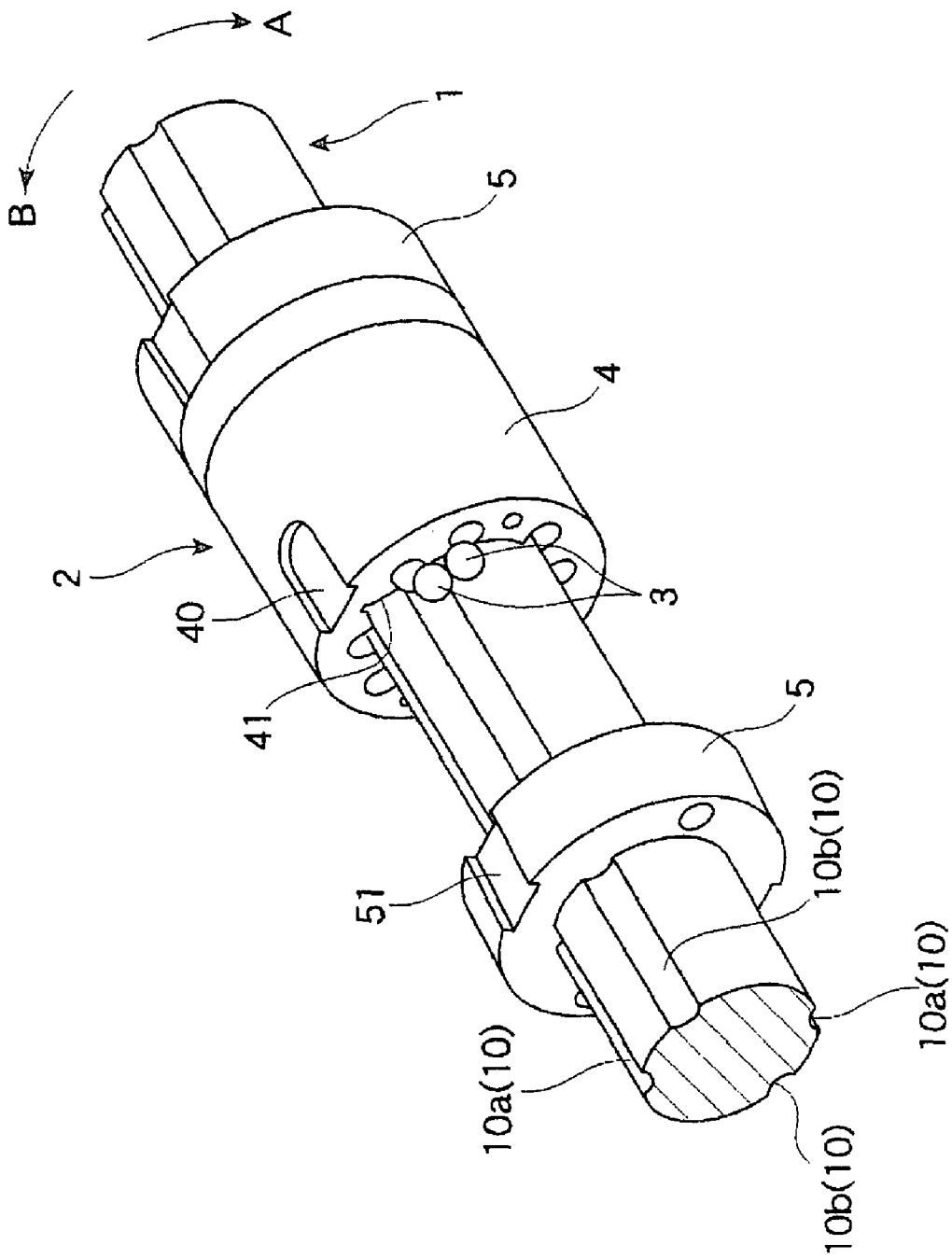
FIG. 1 is a partially exploded perspective view illustrating an embodiment of a ball spline device to which the present invention is applied.
Figure 2:
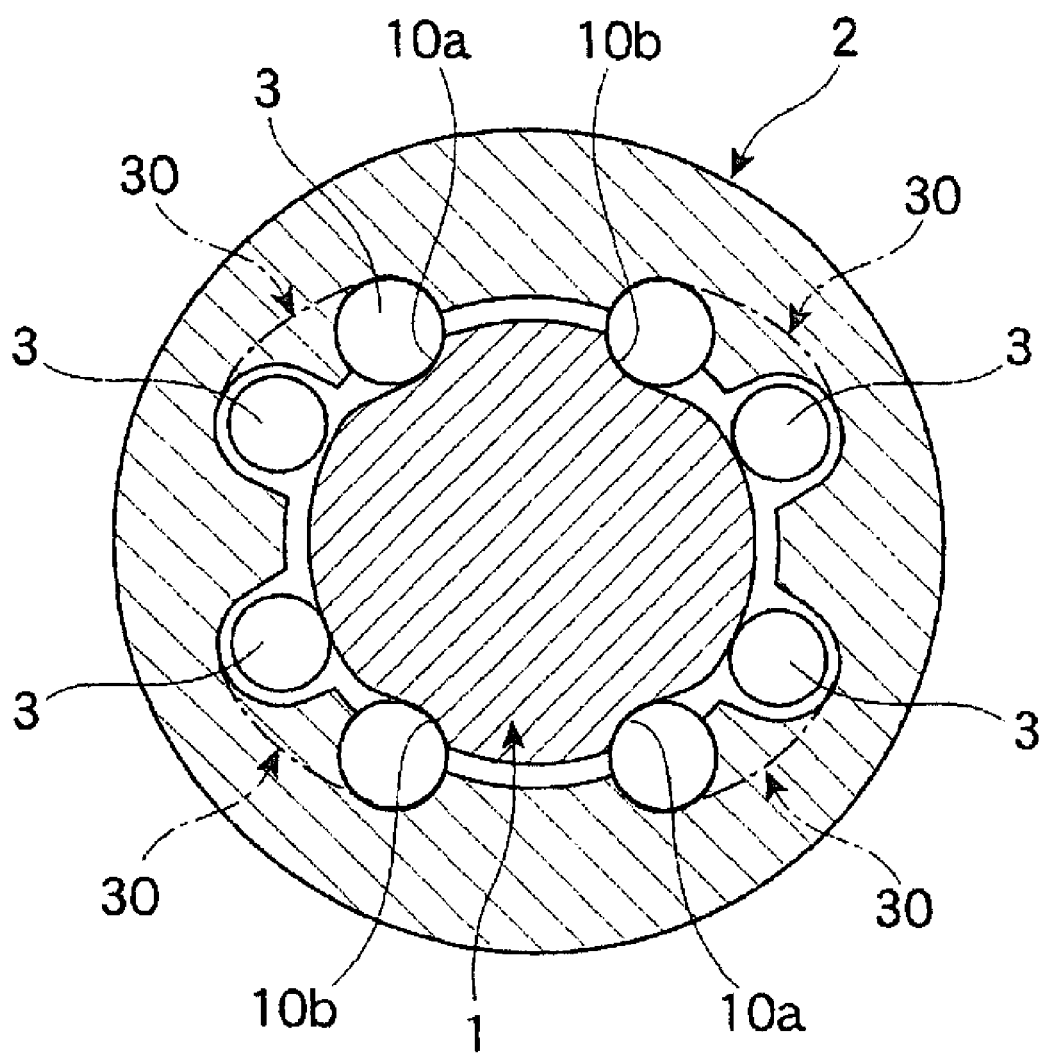
FIG. 2 is a sectional view perpendicular to an axial direction of the ball spline device illustrated in FIG. 1.

FIGS. 1 and 2 illustrate an embodiment of the ball spline device to which the present invention is applied. This ball spline device includes a spline shaft 1 formed into a substantially columnar shape in cross section and a nut member 2 formed into a substantially cylindrical shape and assembled to the spline shaft 1 through an intermediation of a large number of balls 3, the nut member 2 freely reciprocating about the spline shaft 1 in the axial direction.

In the outer peripheral surface of the spline shaft 1, four ball rolling grooves 10 are formed along the axial direction. The balls 3 bear load between the nut member 2 and the spline shaft 1 while rolling in the ball rolling grooves 10. The ball rolling grooves 10 are formed into circular-arc shapes in cross section perpendicular to the longitudinal direction thereof, that is, formed into shapes of single arcs slightly larger in curvature than spherical surfaces of the balls. Each of the ball rolling grooves 10 includes a ball rolling groove 10a in which the balls 3 bear load when the nut member 2 rotates about the spline shaft 1 in the direction of an arrow A, and a ball rolling groove 10b in which the balls 3 bear load when the nut member 2 rotates in the direction of an arrow B. The ball rolling groove 10a and the ball rolling groove 10b adjacent to each other are formed in a group, and a plurality of the groups are formed at equal intervals in the outer peripheral surface of the spline shaft 1. With this structure, rotational torque can be transmitted between the nut member 2 and the spline shaft 1. In the ball spline device illustrated in FIGS. 1 and 2, four ball rolling grooves 10 corresponding to two groups are formed in the outer peripheral surface of the spline shaft 1. Alternatively, six or eight ball rolling grooves corresponding to three or four groups, respectively, may be formed.

Meanwhile, the nut member 2 includes a metal nut body 4 and a pair of end caps 5 fastened to both ends in the axial direction of the nut body 4 with bolts, the nut body 4 and the end caps 5 each having a through-hole in which the spline shaft 1 is inserted. Further, key grooves 40 are formed in the outer peripheral surface of the nut body 4, and are used when the nut member 2 is attached to a mechanical apparatus.

The nut member 2, which is formed by a combination of the nut body and the end caps as described above, has track grooves 30 which are formed in an inner peripheral surface of the through-hole thereof and in which the balls 3 endlessly circulate, the inner peripheral surface facing the spline shaft 1. The track grooves 30 include linear load grooves 31 formed in the inner peripheral surface of the nut body 4 while facing the ball rolling grooves 10 of the spline shaft 1, linear non-load grooves 32 formed parallel to and at small intervals from the linear load grooves 31 with respect to the inner peripheral surface of the nut body 4, and ball deflection grooves 33 for converting the rolling direction of the balls 3 by 180 degrees between the linear load grooves 31 and the linear non-load grooves 32 and communicating the balls 3 between those grooves. The entire regions of the track grooves 30 are opened to the spline shaft 1, and the balls 3 arranged in the track grooves 30 circulate in the track grooves 30 in a state of facing the spline shaft 1.

Figure 3:
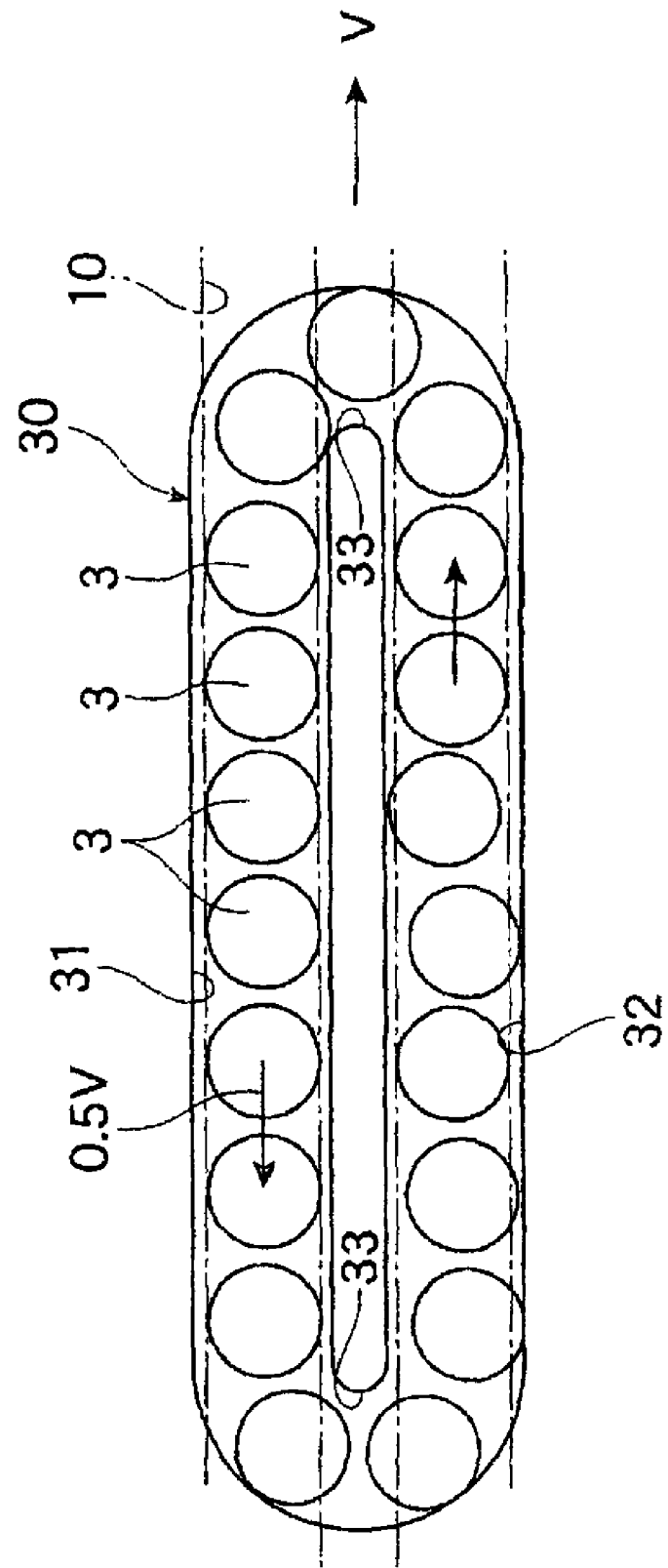
FIG. 3 is a plan view illustrating a state of developing on a plane a track groove provided to a nut member.

FIG. 3 illustrates one of the track grooves 30, which is developed on a plane. The linear load grooves 31 constituting a part of the track grooves 30 are formed into a circular-arc shape in cross section perpendicular to the longitudinal direction thereof similarly to the ball rolling grooves 10 on the spline shaft 1 side. The four ball rolling grooves 10 are formed to the spline shaft 1, and hence directions in which the balls 3 and the ball rolling grooves 10 of the spline shaft 1 or the linear load grooves 31 of the nut member 2 are brought into contact with each other are different from each other by 90 degrees in the circumferential direction of the spline shaft 1. With this configuration, the nut member 2 is capable of reciprocating along the spline shaft 1 while bearing load applied from all the directions except the axial direction of the spline shaft 1.

Meanwhile, the linear non-load grooves 32 constituting a part of the track grooves 30 are formed as paths slightly larger than a diameter of the balls 3, and formed in the inner peripheral surface of the nut member in a state of being opened to the outer peripheral surface of the spline shaft 1. Accordingly, the balls 3 are accommodated in the linear non-load grooves 32 in a non-load state, that is, a state of being able to freely rotate. Further, the linear non-load grooves 32 are opened to the spline shaft 1, and hence the balls 3 roll in the inside of the linear non-load grooves 32 while being held in contact with the spline shaft 1.

Further, the ball deflection grooves 33 have substantially U-shaped traces so as to couple the linear load grooves 31 and the linear non-load grooves 32 with each other. The ball deflection grooves 33 release load of the balls 3 having rolled in the linear load grooves 31 while bearing load, and feed the balls 3 into the linear non-load grooves 32 by gradually changing the rolling direction of the balls 3 so as to convert the rolling direction of the balls 3 by 180 degrees. The ball deflection grooves 33 are shallowest at coupling parts with the linear load grooves 31, and deepest at coupling parts with the linear non-load grooves 32. Owing to gradual increase in depth of the ball deflection grooves 33, when the balls 3 having rolled in the linear load grooves 31 enter one of the ball deflection grooves 33, the balls 3 are released from load. Then, the balls 3 enter a non-load state and advance in the one of the ball deflection grooves 33 toward the linear non-load grooves 32. In this state, the balls 3 enter the linear non-load grooves 32.

When the nut member 2 is moved along the spline shaft 1, the balls 3 sandwiched between the ball rolling grooves 10 of the spline shaft 1 and the linear load grooves 31 of the nut member 2 move in the linear load grooves 31 at velocity of 0.5 V, that is, at a half of moving velocity V of the nut member 2 with respect to the spline shaft 1. When reaching the ball deflection grooves 33, the balls 3 rolling in the linear load grooves 31 are gradually released from load owing to the above-mentioned gradual increase in depth of the ball deflection grooves 33. The balls 3 released from load successively advance in the ball rolling grooves 10 of the spline shaft 1 while being pushed by subsequent balls 3. In this context, the ball deflection grooves 33 obstruct the rolling of the balls 10 in the ball rolling grooves 10 and forcibly change the advancing direction of the balls 3. Thus, the balls 3 are moved relatively to one side of the ball rolling grooves 10 by means of the ball deflection grooves 33, and climb along the profile (outer shape) of the spline shaft 1 up to the outer peripheral surface of the spline shaft. Thus, the balls 3 are completely departed from the ball rolling grooves 10 of the spline shaft 1, and completely accommodated in the ball deflection grooves 33 of the nut member 2.

The ball deflection grooves 33 developed on a plane have substantially U-shaped traces, and hence the balls 3 accommodated in the ball deflection grooves 33 are reversed in rolling direction, and enter the linear non-load grooves 32 of the nut member 2, which face the outer peripheral surface of the spline shaft 1. Further, the balls 3 advancing in the linear non-load grooves 32 enter the ball deflection grooves 33 on the opposite side so as to be reversed in rolling direction again, and thereafter come between the ball rolling grooves 10 of the spline shaft 1 and the linear load grooves 31 of the nut member 2. In this case, the balls 3 roll along the profile (outer shape) of the spline shaft so as to enter the ball rolling grooves 10, and shift from a non-load state to a loaded state as the ball deflection grooves 33 become gradually shallower.

The balls 3 circulate in the track grooves 30 of the movable block 2 as described above, and in accordance therewith, the nut member 2 can be constantly and continuously moved along the spline shaft 1.

Figure 4:
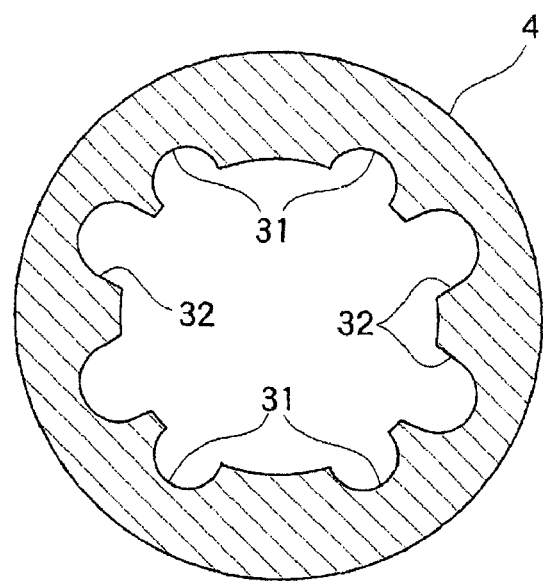
FIG. 4 is a sectional view perpendicular to an axial direction of a nut body constituting the nut member.

Of the linear load grooves 31, the linear non-load grooves 32, and the ball deflection grooves 33, which constitute the track grooves 30, the linear load grooves 31 and the linear non-load grooves 32 are formed in the inner peripheral surface of the through-hole of the nut body 4. FIG. 4 illustrates a cross section perpendicular to the axial direction of the nut body 4, and the sectional shape continuously extends in the axial direction of the nut body 4. The shape of the inner peripheral surface of the nut body 4, which includes those of the linear load grooves 31 and the linear non-load grooves 32, is formed by wire-cut electro-discharge machining. The linear load grooves 31 may be subjected to grinding after wire-cut electro-discharge machining so as to improve the surface roughness thereof. As a matter of course, when the inner diameter of the through-hole of the nut body 4 is large, instead of wire-cut electro-discharge machining, the linear load grooves 31 and the linear non-load grooves 32 may be formed by trimming or grinding with respect to the cylindrical nut body 4 having an uniform inner peripheral surface.

Figure 5:
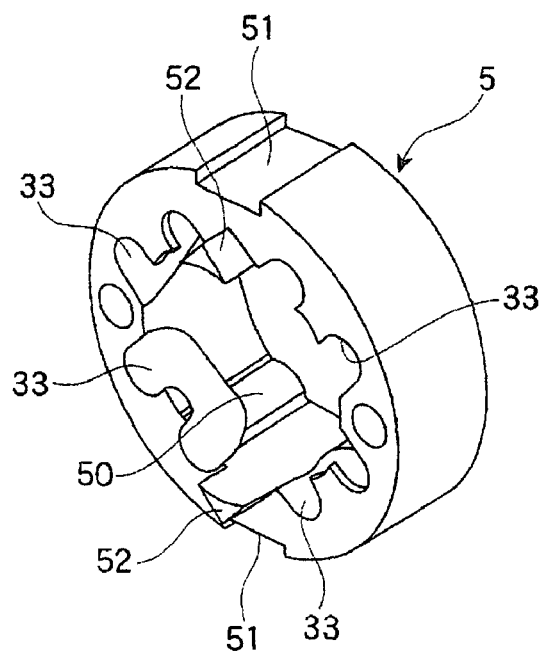
FIG. 5 is a perspective view of one of end caps constituting the nut member.

Meanwhile, the ball deflection grooves 33 constituting the track grooves 30 are formed to the endcaps. FIG. 5 is a perspective view of the one of the end caps 5 as observed from the nut body 4 side. In the inner peripheral surfaces of the through-holes of the end caps 5, there are formed the U-shaped ball deflection grooves 33 and sealing protrusions 50 facing the ball rolling grooves 10 of the spline shaft 1 through an intermediation of slight gaps. Further, in the outer peripheral surfaces of the end caps 5, there are formed access grooves 51 continuous with the key grooves 40 of the nut body 4. Even in a state in which the end caps 5 are fixed to the nut body 4, keys can be slid into the key grooves 40 of the nut body 4 from the axial direction of the nut member 2. Further, studs 52 for positioning with respect to the nut body 4 protrude from the end caps 5. The studs 52 are fitted to reference holes 41 of the nut body 4, whereby the end caps 5 are accurately positioned with respect to the nut body 4, and the ball deflection grooves 33 on the end caps 5 side and the linear load grooves 31 and the linear non-load grooves 32 on the nut body 4 are accurately coupled with each other.

The end caps 5 have complicated shapes, and hence manufactured by injection molding of a synthetic resin. Examples of the other adoptable manufacturing methods include metal injection molding (MIM). Further, when the outer diameter of the spline shaft is large and the end caps are increased in size, the end caps can be formed by trimming.

Further, in FIG. 1, the nut member 2 is constituted by combination of the nut body 4 and the end caps 5. This is because, when the outer diameter of the spline shaft 1 is small, it is difficult to form the ball deflection grooves 33 in the inner peripheral surface of the nut member 2 by trimming or grinding. When the outer diameter of the spline shaft 1 is sufficiently large, and the ball deflection grooves 33 are easily formed in the inner peripheral surface of the nut member 2 by trimming or grinding, the nut member 2 may be manufactured with use of a single metal material.

Figure 6:
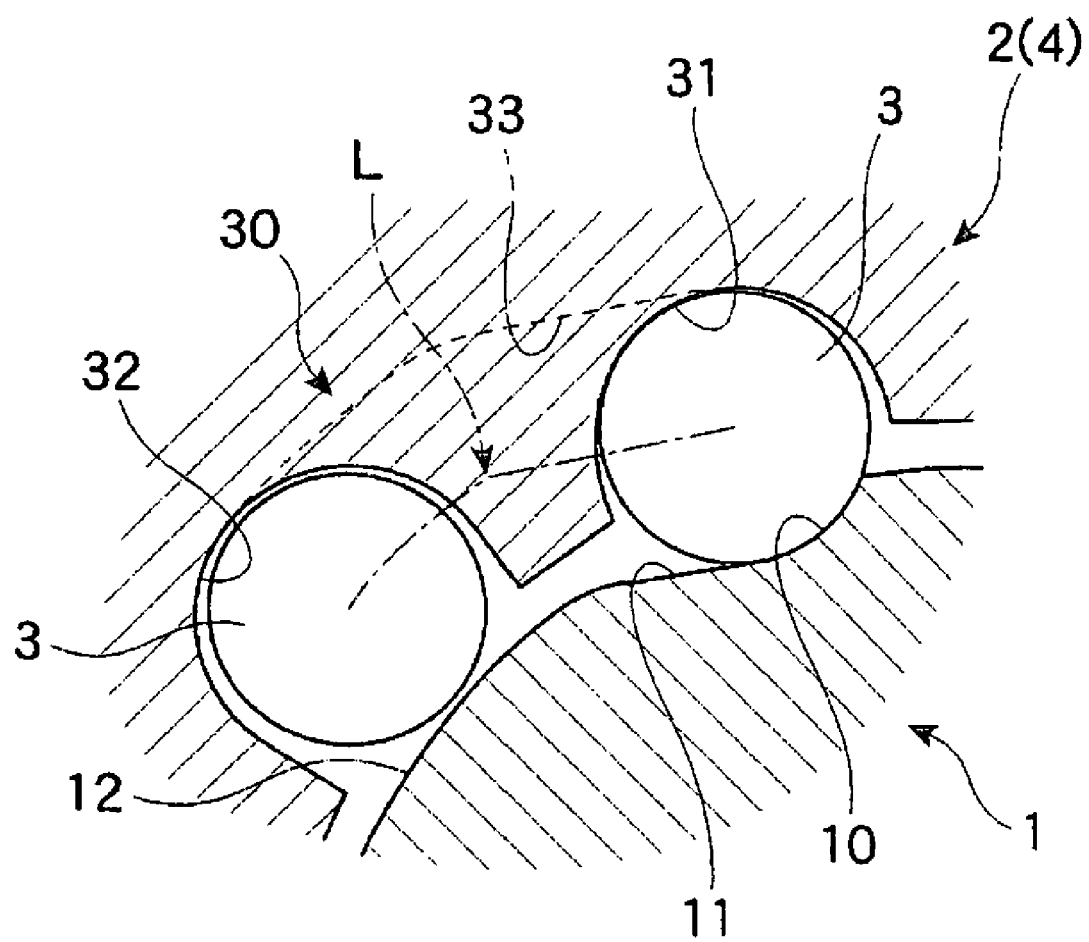
FIG. 6 is an enlarged view of balls rolling in the track groove as observed from an axial direction of the spline shaft.

FIG. 6 is an enlarged view of the balls 3 rolling in one of the track grooves 30 as observed from the axial direction of the spline shaft 1. A flat ball guiding surface 11 adjacent to each of the ball rolling grooves 10 is formed to the spline shaft 1. The ball guiding surface 11 is provided on one side of each of the ball rolling grooves 10 while facing the ball deflection grooves 33 provided to the nut member 2, and is formed along the normal line direction of the ball rolling grooves 10 formed into circular-arc shapes. In addition, an end portion of the ball guiding surface 11 on the opposite side to each of the ball rolling grooves 10 is connected to an outer peripheral surface 12 of the spline shaft 1, which is formed with a constant curvature.

With use of a formed grinding wheel, the ball guiding surface 11 as described above can be formed simultaneously with each of the ball rolling grooves 10 by grinding with respect to the spline shaft 1. As a result, it is possible to significantly enhance continuity between the ball guiding surface 11 and each of the ball rolling grooves 10.

The ball guiding surface 11 smoothly continuous with each of the ball rolling grooves 10 is formed, whereby the balls 3 obstructed from rolling in each of the ball rolling grooves 10 of the spline shaft 1 by the ball deflection grooves 33 are departed from each of the ball rolling grooves 10 along the ball guiding surface 11 while being changed in advancing direction thereof, and then reach the outer peripheral surface 12 of the spline shaft 1. Further, the balls 3 rolling in the ball deflection grooves 33 enter the linear non-load grooves 32 along the outer peripheral surface 12 of the spline shaft 1. A chain line in FIG. 6 indicates a rolling trace L of the balls 3 in the ball deflection grooves 33. Between the linear load grooves 31 and the linear non-load grooves 32, that is, in the ball deflection grooves 33, the balls 3 move along the ball guiding groove 11 and the outer peripheral surface 12 of the spline shaft 1 while being held in contact therewith. Thus, apparently from the figure, a trace obtained by projecting the rolling trace L of the balls 3 in the ball deflection grooves 33 to a cross section perpendicular to the axial direction of the spline shaft 1 conforms to the profile (outer shape) of a part of the spline shaft 1, which faces the ball deflection grooves 33.

Thus, the endless circulation path of the balls 3, which is provided to the nut member 2, is in proximity to the spline shaft 1 at a maximum level. As a result, when the endless circulation path of the balls 3 is provided to the nut member 2, it is possible to reduce the thickness of the nut member 2, that is, the difference between the inner diameter and the outer diameter of the nut member 2, and possible to reduce the diameter of the nut member 2 when the outer diameter of the spline shaft 1 and the diameter of the balls 3 used are the same. Further, when the outer diameter of the nut member 2 is regarded as a reference, the thickness of the nut member 2 can be reduced, and the outer diameter of the spline shaft 1 can be increased by that much. As a result, it is possible to enhance permissible load, rigidity, and the like of the ball spline device.

Further, the ball guiding surface 11 is formed along the normal line direction of each of the ball rolling grooves 10 formed into circular-arc shapes, and smoothly continuous with each of the ball rolling grooves 10. Therefore, even when the balls 3 rolling in the ball rolling grooves 10 are forcibly changed in advancing direction thereof, the balls 3 can be departed from each of the ball rolling grooves 10 and shifted to the ball guiding surface 11 without involving clogging, whereby communication of the balls 3 between the linear load grooves 31 and the ball deflection grooves 33 can be smoothly performed. With this configuration, in the ball spline device of the present invention, endless circulation of the balls 3 in the track grooves 30 can be performed more smoothly.

Further, when smoother endless circulation of the balls 3 in the track grooves 30 is taken into consideration, it is preferable that connected portions between the ball guiding surface 11 and the outer peripheral surface 12 of the spline shaft 1 be formed as a smooth continuous surface free from boundaries.

The invention claimed is:

1. A ball spline device, comprising:
a spline shaft in which a ball rolling groove (10a, 10b) is formed on an outer peripheral surface thereof along an axial direction; and
a nut member (2) formed into a substantially cylindrical shape so that the spline shaft (1) passes therethrough, assembled to the spline shaft (1) through an intermediation of a large number of balls (3), and having a track groove (30) which is formed on an inner peripheral surface facing the spline shaft (1), the balls (3) circulating in the track groove (30), wherein:
the track groove (30) comprises:
a linear load groove (31) formed so as to face the ball rolling groove (10a, 10b) of the spline shaft (1) and to form a load path of the balls;
a linear non-load groove (32) provided parallel to the linear load groove (31) and opened to the outer peripheral surface of the spline shaft (1); and
a pair of ball deflection grooves (33) for communicably coupling the linear load groove (31) and the linear non-load groove (32) with each other so as to allow the balls (3) to intercommunicate therebetween while being opened to the outer peripheral surface of the spline shaft (1);
the ball deflection grooves (33) guide, while forcibly changing an advancing direction of the balls (3) rolling in the ball rolling groove of the spline shaft (1) and causing the balls (3) to depart from the ball rolling groove (10a, 10b) with use of a profile of the spline shaft (1), the balls (3) departed therefrom into the linear non-load groove (32) in cooperation with the outer peripheral surface of the spline shaft (1);
wherein, on one side of the ball rolling groove (10a, 10b) of the spline shaft (1), a ball guiding surface (11) is formed at a portion facing one of the ball deflection grooves (33) of the nut member (2), the ball guiding surface (11) being smoothly continuous from the ball rolling groove (10a, 10b);
wherein said ball deflection grooves (33) gradually increase in depth from a shallowest at coupling parts with the linear load groove (31) to a deepest at coupling parts with the linear non-load groove (32) and wherein owing to said gradual increase in depth of the ball deflection grooves (33), a) when balls enter the ball deflection grooves from the linear load groove (31) the balls are gradually released from load within said deflection grooves such as to gradually transition within said deflection grooves from a loaded state to a non-loaded state and b) when balls enter the ball deflection grooves from the linear non-load groove (32) the balls are gradually increased in load within said deflection grooves such as to gradually transition within said deflection grooves from an non-loaded state to a loaded state; and wherein the nut member (2) comprises: a nut body (4) in which the linear load groove (31) and the linear non-load groove (32) are formed; and a pair of end caps (5) in which the ball deflection grooves (33) are formed and which are fixed to both end portions in an axial direction of the nut body (4).

2. The ball spline device according to claim 1, wherein a trace obtained by projecting a rolling trace of the balls (3) in the ball deflection grooves (33) to a cross section perpendicular to an axial direction of the nut member (2) conforms to the profile of the spline shaft (1) facing the ball deflection grooves (33).

3. The ball spline device according to claim 1, wherein the ball rolling groove (10*a*, 10*b*) comprising an even number of ball rolling grooves (10*a*, 10*b*) formed in pairs is formed in the spline shaft (1), each of the ball rolling grooves having a circular-arc shape in cross section perpendicular to a longitudinal direction thereof.

4. The ball spline device according to claim 1, wherein the nut member (2) is formed of a single member, and has the inner peripheral surface in which the track groove (30) is formed.

* * * * *